US010368028B2

(12) United States Patent
Hembert

(10) Patent No.: US 10,368,028 B2
(45) Date of Patent: *Jul. 30, 2019

(54) DETECTION OF AN ANALOG CONNECTION IN A VIDEO DECODER

(71) Applicant: STMicroelectronics (Alps) SAS, Grenoble (FR)

(72) Inventor: Serge Hembert, Vaulnaveys le Haut (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,476

(22) Filed: Oct. 5, 2017

(65) Prior Publication Data

US 2018/0035069 A1 Feb. 1, 2018

Related U.S. Application Data

(63) Continuation of application No. 15/237,103, filed on Aug. 15, 2016, now Pat. No. 9,813,655.

(30) Foreign Application Priority Data

Jan. 29, 2016 (FR) ..................................... 16 50731

(51) Int. Cl.
*H04N 5/44* (2011.01)
*G09G 5/00* (2006.01)

(52) U.S. Cl.
CPC ............... *H04N 5/44* (2013.01); *G09G 5/006* (2013.01); *G09G 2340/02* (2013.01);
(Continued)

(58) Field of Classification Search
CPC ................................ H04N 5/44; G09G 5/006
(Continued)

(56) References Cited

U.S. PATENT DOCUMENTS 4,721,943 A * 1/1988 Stallkamp ............. H03M 1/745 315/367
5,512,961 A * 4/1996 Cappels, Sr. .......... H04N 9/645 348/173

(Continued)

FOREIGN PATENT DOCUMENTS

JP 2004215054 A 7/2004

OTHER PUBLICATIONS

INPI Search Report and Written Opinion for FR 1650731 dated Apr. 19, 2016 (9 pages).

*Primary Examiner* — Brian P Yenke
(74) *Attorney, Agent, or Firm* — Crowe & Dunlevy

(57) ABSTRACT

A video and/or audio decoder provided with a first terminal for supplying an analog audio and/or video signal, including: a first circuit capable of supplying a digital signal which is an image of said analog signal; a digital-to-analog converter capable of receiving as an input said digital signal; an amplifier coupling a second output terminal of the digital-to-analog converter to the first terminal; and a second circuit capable of comparing a signal representative of the voltage or current level on the first terminal with a reference signal, and of deducing therefrom whether the first terminal is connected or not to an analog input terminal of a video signal display and/or audio signal playing device.

20 Claims, 4 Drawing Sheets

(52) U.S. Cl.
CPC ..... *G09G 2370/20* (2013.01); *G09G 2370/22* (2013.01); *H04R 2420/05* (2013.01)

(58) Field of Classification Search
USPC ....... 348/572, 508, 515, 516, 522, 537, 554, 348/564, 571, 573, 575, 605, 639, 646, 348/651, 660, 441, 468, 474, 300, 301, 348/69, 87, 126, 129, 133, 707, 712, 719, 348/720, 723, 725, 731, 737, 738, 739, 348/792; 341/110, 116, 117, 118, 120, 341/144, 155, 156; 361/7, 30, 31, 57, 70, 361/79, 87, 93.9, 154, 794
See application file for complete search history.

(56) References Cited

U.S. PATENT DOCUMENTS 5,760,729 A * 6/1998 Rumreich ............... H03M 1/36 341/159
5,798,802 A * 8/1998 Elmis ....................... H04N 5/18 348/689
5,811,993 A * 9/1998 Dennard .................. G01R 1/28 327/538
5,844,629 A 12/1998 Murray et al.
7,158,068 B2 1/2007 Kobayashi et al.
7,355,656 B2 * 4/2008 Yoshida ................ H03M 1/187 348/678
8,184,028 B2 * 5/2012 Tsai ......................... H04N 5/14 341/144
9,813,655 B2 * 11/2017 Hembert .................. H04N 5/44
2002/0050372 A1 5/2002 Lee
2002/0074948 A1 6/2002 Aso
2003/0234686 A1 12/2003 Kang et al.
2004/0124824 A1 * 7/2004 Proll ......................... G05F 3/30 323/315
2004/0263180 A1 12/2004 Rogers et al.
2005/0036758 A1 2/2005 Huang
2005/0117872 A1 6/2005 Liu et al.
2005/0177653 A1 8/2005 Chiu
2005/0243217 A1 * 11/2005 Yun ........................ H03D 3/008 348/725
2006/0001779 A1 * 1/2006 Favrat .............. H04N 21/42638 348/725
2006/0022851 A1 2/2006 Leung et al.
2006/0044474 A1 * 3/2006 Stutz ................... H03M 1/1295 348/691
2006/0238238 A1 * 10/2006 Choi ................... H03F 3/45183 327/560
2006/0293011 A1 12/2006 Park et al.
2007/0081113 A1 4/2007 Tsunoda et al.
2007/0091052 A1 * 4/2007 Tsuchi ................. G09G 3/3688 345/100
2007/0176811 A1 * 8/2007 Hsu ...................... G09G 3/3688 341/144
2007/0229439 A1 10/2007 Wang et al.
2008/0032658 A1 2/2008 Tsai et al.
2008/0063049 A1 * 3/2008 Tsai ......................... H04N 5/14 375/240.01
2008/0084338 A1 4/2008 Tsai et al.
2008/0088742 A1 4/2008 Li et al.
2009/0046083 A1 * 2/2009 Kim ......................... G09G 3/20 345/204
2009/0185545 A1 7/2009 Tarighat-Mehrabani et al.
2009/0190033 A1 7/2009 Asada et al.
2010/0128177 A1 5/2010 Chen et al.
2011/0043703 A1 * 2/2011 Cheng ................... G06F 3/1431 348/607
2011/0157372 A1 * 6/2011 Liu ........................ H04N 9/641 348/180
2011/0157445 A1 6/2011 Itonaga et al.
2011/0175589 A1 * 7/2011 Kurimoto ................ H04Q 9/00 323/304
2011/0181789 A1 7/2011 Nishimura
2011/0234807 A1 9/2011 Jones et al.
2011/0254721 A1 10/2011 Sakai
2012/0081499 A1 4/2012 Tsunashima et al.
2012/0126763 A1 * 5/2012 Yang ......................... G05F 1/56 323/282
2012/0146828 A1 6/2012 Narathong et al.
2012/0200172 A1 8/2012 Johnson et al.
2012/0208473 A1 * 8/2012 Aparin ................. H04B 1/0458 455/73
2013/0163647 A1 6/2013 Hagisawa et al.
2013/0187712 A1 * 7/2013 Cabanillas ............... H03H 7/40 330/192
2014/0002289 A1 1/2014 Dempsey
2014/0022439 A1 1/2014 Aoki
2014/0055676 A1 * 2/2014 Matsumoto ........... H03M 3/458 348/572
2014/0091807 A1 * 4/2014 Lontka ................. G01R 31/025 324/509
2014/0118174 A1 5/2014 Arai et al.
2014/0191670 A1 * 7/2014 Ge ..................... H05B 33/0815 315/186
2014/0286091 A1 * 9/2014 Uemura ................. G11C 16/30 365/185.2
2014/0306753 A1 10/2014 Jeong
2015/0009197 A1 * 1/2015 Xu ......................... G09G 5/006 345/212
2015/0303790 A1 10/2015 Lin et al.
2015/0311694 A1 * 10/2015 Cojocaru ............... G08B 29/06 361/89
2015/0382104 A1 * 12/2015 Hogan ..................... H04R 3/00 381/71.7
2017/0222656 A1 * 8/2017 Hembert ................. H03M 1/66

* cited by examiner

DETECTION OF AN ANALOG CONNECTION IN A VIDEO DECODER

CROSS REFERENCE TO RELATED APPLICATIONS

This application is a continuation of U.S. patent application Ser. No. 15/237,103 filed Aug. 15, 2016, which claims the priority benefit of French Application for Patent No. 1650731, filed on Jan. 29, 2016, the disclosures of which are hereby incorporated by reference in their entireties to the maximum extent allowable by law.

TECHNICAL FIELD

The present disclosure generally relates to video decoders, and more particularly to decoders capable of providing analog video signals to be displayed by display devices provided with analog video inputs.

BACKGROUND

A video decoder is conventionally placed upstream of a display device such as a television set, a video projector, a computer screen, etc. The decoder receives a compressed digital video flow, for example, from the Internet (ADSL, cable, etc.), from a digital optical disk (DVD, Blu-ray, etc.), from a hard disk, from a digital radio receiver, or from any storage or digital transmission support, and converts this flow into a video signal adapted to the downstream display device. To guarantee the compatibility with various display devices, a video decoder generally has a plurality of output interfaces capable of supplying the decoded video flow in different formats. In recent installations, the link between the decoder and the display device most often is a digital link, for example, an HDMI link or a DVI link. However, to ensure the compatibility with older installations and/or with certain specific applications, video decoders are further almost systematically equipped with one or a plurality of analog video outputs, for example, an output at the CVBS format (composite video) and/or an output at the YPbPr format. In the case of a digital link, standardized communication protocols enable the decoder and the display device to detect that the two devices have been connected. This, for example, enables the display device to configure itself to display the video flow transmitted on its digital input, without for the user to have to intervene. In the case of an analog link, the decoder and the display device do not automatically detect the connection, and the user has to manually configure the display device so that it displays the video flow received on its analog input. It would be desirable to have a video decoder capable of automatically detecting an analog connection with a display device, so that, for example, the decoder can communicate the connection information to the display device, or for any other application capable of using this information.

SUMMARY

Thus, an embodiment provides a video and/or audio decoder provided with a first terminal for supplying an analog audio and/or video signal, comprising: a first circuit capable of supplying a digital signal which is an image of said analog signal; a digital-to-analog converter capable of receiving as an input said digital signal; an amplifier coupling a second output terminal of the digital-to-analog converter to the first terminal; and a second circuit capable of comparing a signal representative of the voltage or current level on the first terminal with a reference signal, and of deducing therefrom whether the first terminal is connected or not to an analog input terminal of a video signal display and/or audio signal playing device.

According to an embodiment, the reference signal is representative of a video and/or audio signal generated upstream of the amplifier.

According to an embodiment, the second circuit comprises an analog voltage comparator having a first input coupled to the first terminal and having a second input coupled to the second terminal.

According to an embodiment, the second circuit further comprises a resistive voltage dividing bridge coupling the first input of the comparator to the first terminal.

According to an embodiment, attenuation factor R2/(R1+R2) of the resistive dividing bridge is such that value G*R2/(R1+R2) is greater than 1 and that value (G/2)*R2/(R1+R2) is smaller than 1, where G designates the voltage gain of the amplifier.

According to an embodiment, the second circuit comprises an analog-to-digital converter having its input coupled to the first terminal.

According to an embodiment, the second circuit further comprises a third digital processing circuit capable of comparing the output signal of the analog-to-digital converter with the digital output signal of the first circuit.

According to an embodiment, the first circuit and the digital-to-analog converter are integrated on a same semiconductor chip.

According to an embodiment, the second circuit is totally or partially integrated in said chip.

According to an embodiment, the second circuit is capable of generating a signal indicative of the presence or not of a connection between the first terminal and an analog input terminal of a video signal display and/or audio signal playing device, and of transmitting this signal to said chip.

According to an embodiment, the decoder comprises an impedance matching resistor between the first terminal and an output terminal of the amplifier, and the second circuit is capable of comparing a signal representative of the voltage across said resistor with said reference signal, and of deducing therefrom whether the first terminal is connected or not to an analog input terminal of a video signal display and/or audio signal playing device.

In an embodiment, an electronic device comprises: an digital to analog converter configured to receive a digital video signal and to output an analog video signal; an analog amplifier configured to receive and amplify the analog video signal; an impedance matching circuit coupled to an output of the analog amplifier and configured to match impedance of a corresponding input terminal of the display device; and a circuit configured to compare a voltage based on the amplified analog video signal to a reference signal and to generate a load connection detect signal based thereupon, the load connection detect signal indicating whether the electronic device is coupled to a display device configured to display the output analog video signal.

In an embodiment, a method comprises: converting a digital video signal to an analog video signal; amplifying the analog video signal; passing the amplified analog video signal through an impedance matching circuit configured to match impedance to a corresponding input terminal of a display device to display the amplified analog video signal; and comparing a property of the amplified analog video signal to a reference signal to determine whether the amplified analog video signal is coupled to the display device.

In an embodiment, an electronic device comprises: a digital to analog converter; an analog amplifier coupled to an output of the digital to analog converter; an impedance matching circuit coupled between an output of the analog amplifier and a node; a resistive divider coupled between the node and ground; and a comparator having a non-inverting terminal coupled to a center tap of the resistive divider and an inverting terminal coupled to the output of the digital to analog converter, and generating a flag at its output.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
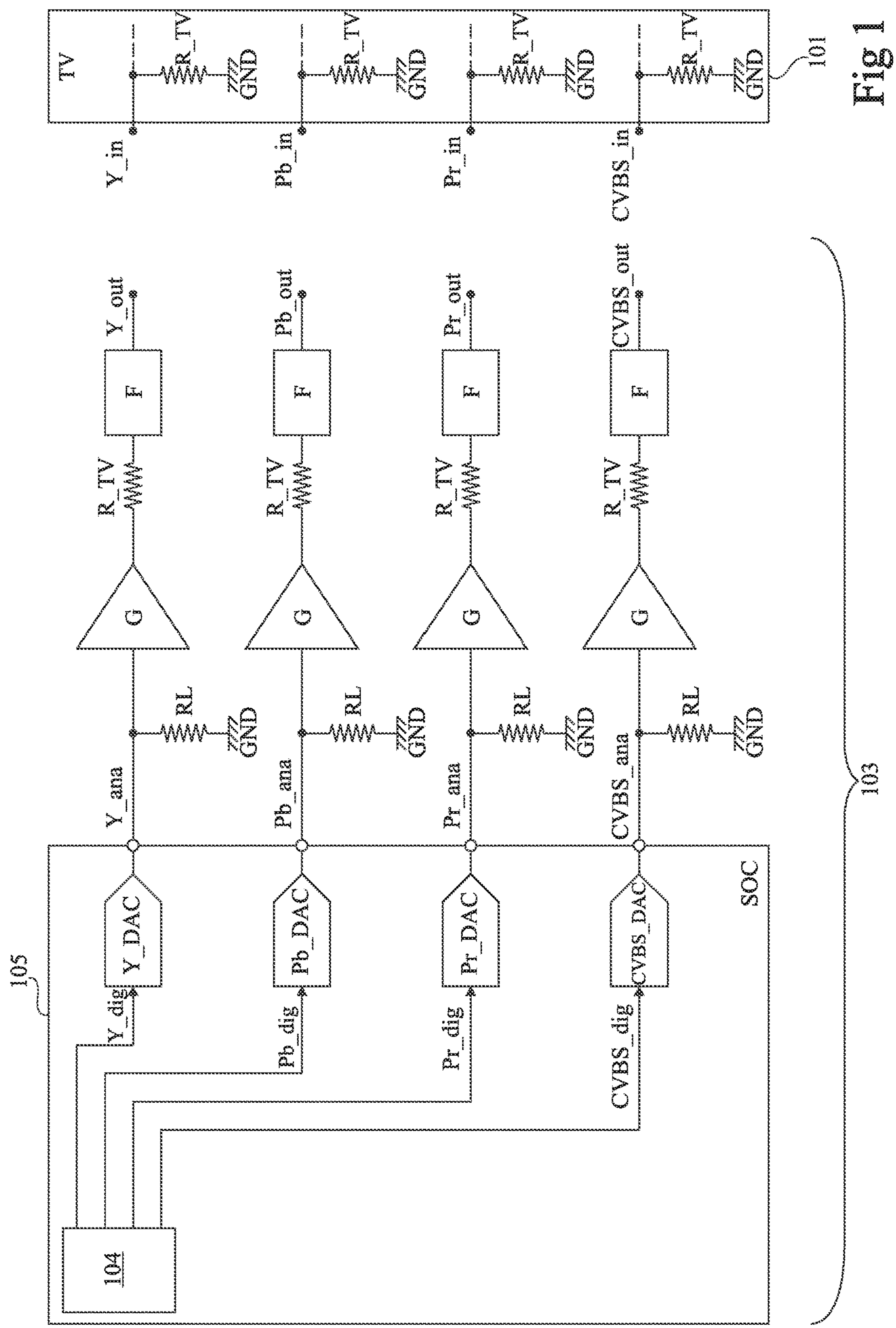
FIG. 1 is a simplified electric diagram of an example of an installation comprising a video decoder capable of supplying analog video signals.

The same elements have been designated with the same reference numerals in the different drawings. For clarity, only those elements which are useful to the understanding of the described embodiments have been shown and are detailed. In particular, in the examples of video decoders of FIGS. 1, 2, 3, and 4, only the analog video signal supply circuits have been shown and are detailed. The other elements that a video decoder may comprise (digital input/output interfaces, digital processing circuits, memories, audio signal management circuits, etc.) are not detailed, the described embodiments being compatible with usual components of a video decoder.

In the present description, term "connected" is used to designate a direct electric link, with no intermediate electronic component, for example, by means of one or a plurality of conductive tracks or of one of a plurality of conductive wires, and term "coupled" or term "linked" is used to designate either a direct electric link (then meaning "connected") or a link via one or a plurality of intermediate components (resistor, diode, capacitor, etc.). Unless otherwise specified, expressions "approximately", "substantially", and "in the order of" mean to within 10%, preferably to within 5%.

FIG. 1 is a simplified electric diagram of an example of an installation comprising a video decoder capable of supplying analog video signals. The installation of FIG. 1 comprises a display device 101, for example, a television set (TV), and a video decoder 103.

In this example, decoder 103 is capable of supplying a decoded video flow in two different analog formats, the CVBS format, also called composite video format, and the YPbPr format. In the CVBS format, the video signal transits on a single conductor conveying both the chrominance information and the luminance information of the image. In the YPbPr format, the video signal transits in parallel over three different conductors respectively transporting a signal corresponding to luminance Y of the image, a signal corresponding to difference Pb=Y−B between luminance Y and the blue component of the image, and a signal corresponding to difference Pr=Y−R between luminance Y and the red component of the image. Thus, decoder 103 comprises four analog output terminals CVBS_out, Pr_out, Pb_out, and Y_out, respectively supplying the analog video signal at the CVBS format, component Pr of the analog video signal at the YPbPr format, component Pb of the analog video signal at the YPbPr format, and component Y of the analog video signal at the YPbPr format. In the shown example, display device 101 comprises four analog input terminals CVBS_in, Pr_in, Pb_in, and Y_in, respectively capable of receiving the analog video signal at the CVBS format, component Pr of the analog video signal at the YPbPr format, component Pb of the analog video signal at the YPbPr format, and component Y of the analog video signal at the YPbPr format. To use the CVBS analog output of decoder 103, the user connects output terminal CVBS_out of decoder 103 to input terminal CVBS_in of display device 101 by means of a cable, not shown. To use analog output YPbPr of decoder 103, the user connects output terminals Y_out, Pb_out, and Pr_out of decoder 103 respectively to input terminals Y_in, Pb_in, and Pr_in of display device 101 by means of cables, not shown.

Inside of decoder 103, the video signals at the CVBS and YPbPr formats are first generated in digital form from the compressed video flow by means of processing circuits which have not been detailed. More particularly, decoder 103 includes a processing circuit 104 (not detailed) supplying in parallel, on four different digital signal transmission paths, a digital signal CVBS_dig representative of the CVBS analog video signal to be transmitted, a digital signal Y_dig representative of component Y of the YPbPr analog video signal to be transmitted, a digital signal Pb_dig representative of component Pb of the YPbPr analog video signal to be transmitted, and a digital signal Pr_dig representative of component Pr of the YPbPr analog video signal to be transmitted.

Decoder 103 further comprises four digital-to-analog converters Y_DAC, Pb_DAC, Pr_DAC, and CVBS_DAC, respectively receiving on their digital inputs signal Y_dig, signal Pb_dig, signal Pr_dig, and signal CVBS_dig. The output of converter Y_DAC is coupled to a terminal Y_ana supplying an analog signal representative of component Y of the YPbPr video signal to be transmitted. The output of converter Pb_DAC is coupled to a terminal Pb_ana supplying an analog signal representative of component Pb of the YPbPr video signal to be transmitted. The output of converter Pr_DAC is coupled to a terminal Pr_ana supplying an analog signal representative of component Pr of the YPbPr video signal to be transmitted. The output of converter CVBS_DAC is coupled to a terminal CVBS_ana supplying an analog signal representative of the CVBS video signal to be transmitted.

In the example of FIG. 1, output terminals Y_ana, Pb_ana, Pr_ana, and CVBS_ana of digital-to-analog converters Y_DAC, Pb_DAC, Pr_DAC, and CVBS_DAC are not directly connected to output terminals Y_out, Pb_out, Pr_out, and CVBS_out of decoder 103, but are coupled thereto via various elements for matching the output signals of the digital-to-analog converters. In the shown example, each of terminals Y_ana, Pb_ana, Pr_ana, CVBS_ana is coupled to the corresponding output terminal Y_out, Pb_out, Pr_out, CVBS_out of decoder 103 via an amplifier G, an impedance matching resistor R_TV, and an analog filter F. More particularly, in the shown example, each of terminals Y_ana, Pb_ana, Pr_ana, CVBS_ana is coupled to the input of an amplifier G, and is further coupled to a reference potential node GND, for example, the ground, via a charge resistor RL. The output of amplifier G is coupled to a first end of an impedance matching resistor R_TV, the second end of resistor R_TV being coupled to the corresponding output terminal Y_out, Pb_out, Pr_out, CVBS_out via a filter F. Amplifier G has the function of increasing the power of the analog signal supplied by the digital-to-analog converter, which is generally too low to be directly transmitted to the display device.

Impedance matching resistor R_TV is selected to be substantially equal to the impedance of the corresponding input terminal Y_in, Pb_in, Pr_in, CVBS_in of display device 101, that is, in the order of 75 ohms in most installations.

Optional filter F enables to remove possible parasitic signals, for example due to the digital-to-analog conversion.

Most often, the digital-to-analog converters of a video decoder (converters Y_DAC, Pb_DAC, Pr_DAC, CVBS_DAC in the shown example) are integrated in a same semiconductor chip 105 (SoC). Chip 105 may be a chip of large dimensions, implementing not only the functions of digital-to-analog conversion of the video signals to be transmitted, but also other functions of the video decoder, for example, the decompressing of the input digital video flow, the generation of digital signals Y_dig, Pb_dig, Pr_dig, CVBS_dig representative of the analog signals to be transmitted, the managing of the different digital and analog interfaces of the decoder, the managing of the audio signals, etc. Output matching elements G, RL, R_TV, F are generally external to chip 105.

Due to the presence of amplifiers G between output terminals Y_ana, Pb_ana, Pr_ana, CVBS_ana of the digital-to-analog converters and output terminals Y_out, Pb_out, Pr_out, CVBS_out, it is not possible to detect the presence or not of an analog connection between decoder 103 and display device 101 by voltage and current measurements on terminals Y_ana, Pb_ana, Pr_ana, CVBS_ana. This results, in particular when the circuits for supplying the decoded analog video signals on terminals Y_ana, Pb_ana, Pr_ana, CVBS_ana are integrated on a same chip 105, in that the latter cannot detect whether an analog link is present between the decoder and the display device.

Figure 2:
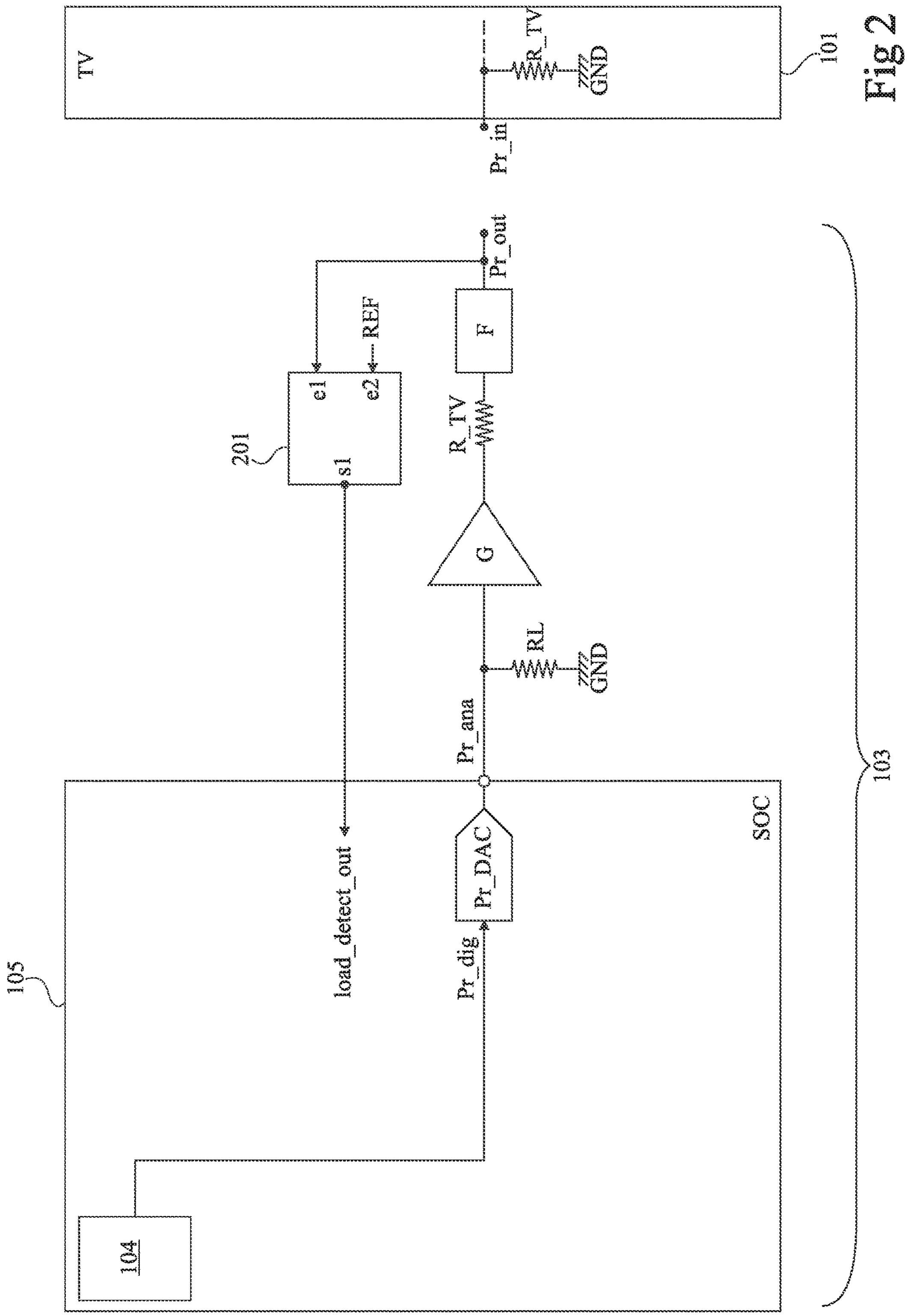
FIG. 2 is a simplified electric diagram of an example of an installation comprising an embodiment of a video decoder capable of supplying analog video signals.

FIG. 2 is a simplified electric diagram of an example of an installation comprising an embodiment of a video decoder capable of supplying analog video signals. The installation of FIG. 2, for example, comprises the same elements as the installation of FIG. 1, arranged in similar or identical fashion. To simplify the drawings, only one analog output path of decoder 103 has been shown in FIG. 2, corresponding to the path supplying component Pr of the analog video signal at the YPbPr format. Similarly, a single analog input path of display device 101 has been shown in FIG. 2, corresponding to the path of reception of component Pr of the analog video signal at the YPbPr format.

In addition to the elements described in relation with FIG. 1, decoder 103 of FIG. 2 comprises a circuit 201 capable of comparing a signal representative of the voltage level on output terminal Pr_out of the decoder with a reference signal REF, and of deducing therefrom whether terminal Pr_out is connected or not to input terminal Pr_in of display device 101. Indeed, in the presence of a connection between terminals Pr_out and Pr_in, output resistor R_TV of decoder 103 forms with input resistor R_TV of display device 101 a voltage dividing bridge having a 1/2 ratio. Thus, the voltage level on output terminal Pr_out of decoder 103 is approximately two times smaller in the presence of a connection between terminals Pr_out and Pr_in than in the absence of a connection.

Circuit 201 comprises an input terminal e1 coupled to terminal Pr_out, and an input e2 receiving reference signal REF. In the shown example, input terminal e1 of circuit 201 is connected to terminal Pr_out. As a variation, input terminal e1 may be connected upstream of filter F, between impedance matching resistor R_TV and filter F. Circuit 201 further comprises a node s1 for supplying a signal load_detect_out indicating whether terminal Pr_out is connected or not to terminal Pr_in. Signal load_detect_out for example is a binary signal set to a first state when terminal Pr_out is connected to terminal Pr_in and to a second state when terminal Pr_out is not connected. As will be described in further detail hereafter in relation with FIGS. 3 and 4, circuit 201 may be totally or partially integrated to chip 105. In all cases, signal load_detect_out may be transmitted to chip 105 so that the latter can adapt its operation by taking into account the result of the detection performed.

Figure 3:
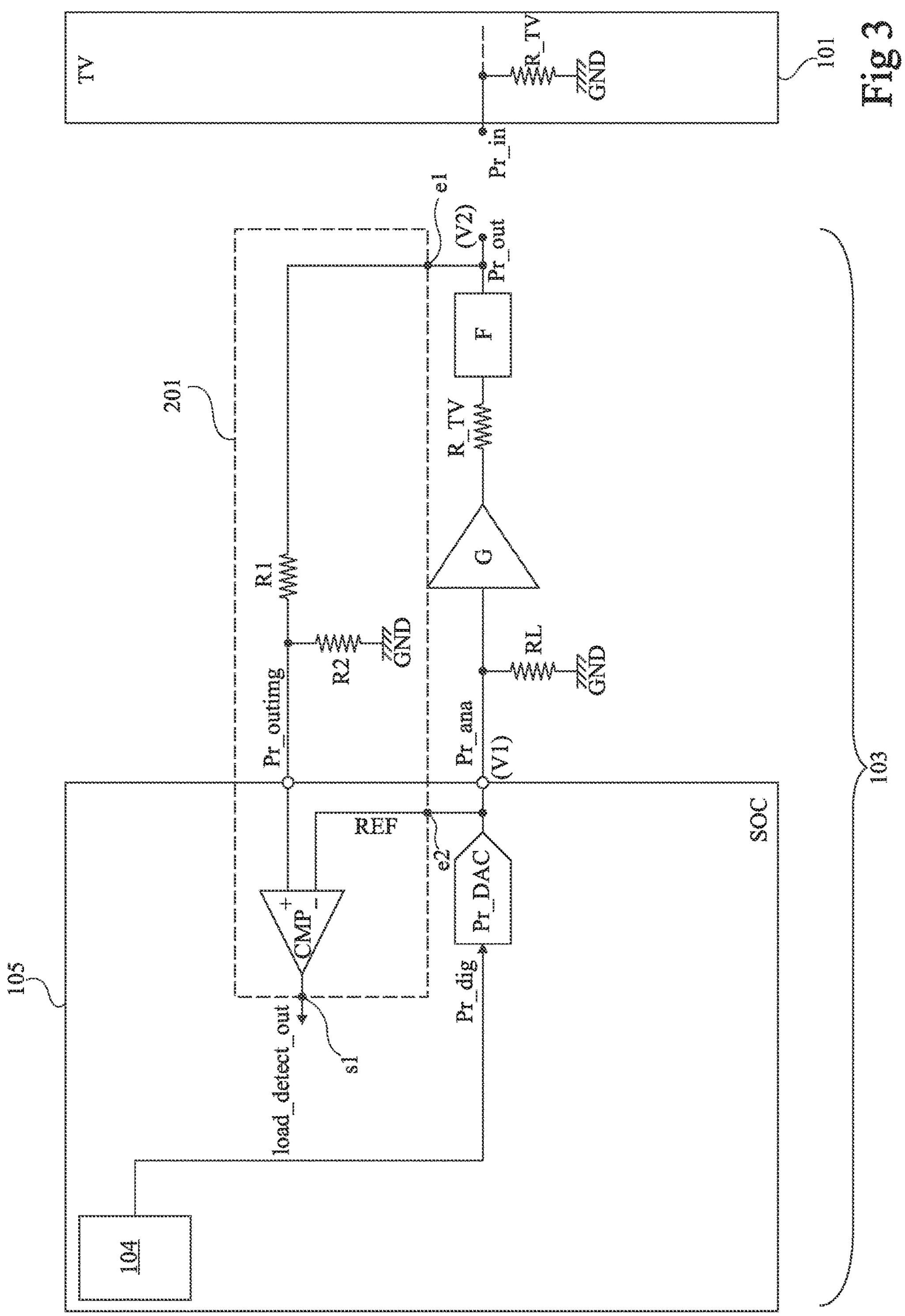
FIG. 3 is an electric diagram of the installation of FIG. 2, illustrating in further detail an embodiment of the video decoder.

FIG. 3 is an electric diagram of the installation of FIG. 2, illustrating in further detail an embodiment of circuit 201 for detecting an analog connection between decoder 103 and display device 101.

In the example of FIG. 3, circuit 201 comprises a voltage comparator CMP, a resistor R1 coupling the positive input (+) of comparator CMP to input terminal e1 of circuit 201, and a resistor R2 coupling the positive input (+) of comparator CMP to a node GND of application of a reference potential, for example, the ground. In this example, input e2 of circuit 201 corresponds to the negative terminal (−) of comparator CMP, and is connected to output terminal Pr_ana of digital-to-analog converter Pr_DAC. Thus, reference signal REF is the output signal of digital-to-analog converter Pr_DAC. Output s1 of circuit 201 corresponds to the output of comparator CMP. As an example, comparator CMP is integrated to chip 105, and resistors R1 and R2 are components external to chip 105. In this example, chip 105 comprises, in addition to terminal Pr_ana, a terminal of connection to the outside Pr_outimg connected, on the one hand (inside of chip 105) to the positive terminal of comparator CMP, and on the other hand (outside of chip 105) to the junction point of resistors R1 and R2.

Circuit 201 of FIG. 3 operates as follows. Calling V1 the voltage level on terminal Pr_ana at a given time and V2 the voltage level on terminal Pr_out at this same time, value V2 is substantially equal to $G*V1$ in the absence of a connection between terminals Pr_out and Pr_in, and to $G*V1/2$ in the presence of a connection between terminals Pr_out and Pr_in (G designating the gain of amplifier G). Comparator CMP compares the level of signal REF, that is, value V1, with an attenuated image of a factor $R2/(R1+R2)$ of the output signal of the decoder, that is, with value $V2*R2/(R1+R2)$. The values of resistors R1 and R2 are selected so that value $(G*V1)*R2/(R2+R1)$ is greater than value V1, and so that value $(G*V1/2)*R2/(R2+R1)$ is smaller than value V1. Thus, output signal load_detect_out of comparator CMP is in a first state when a cable connects terminal Pr_out to terminal Pr_in, and in a second state when terminal Pr_out is not coupled to terminal Pr_in. As an example, considering a decoder where amplifier G has a voltage gain in the order of 2, ratio $R2/(R2+R1)$ may be in the range from 0.5 to 1, for example, in the order of 2/3. Resistors R1 and R2 preferably have high resistances as compared with the resistance of resistor R_TV, for example, at least 100 times greater than the resistance of resistor R_TV, to avoid disturbing the output video signal and to limit the power consumption of circuit 201. As an example, resistors R1 and R2 have resistances greater than 50 kΩ. As an example, resistor R2 has a resistance in the order of 200 kΩ and resistor R1 has a resistance in the order of 100 kΩ in the case of an amplifier having a gain G=2. It should be noted that the selection of a ratio R2/(R2+R1) smaller than 1 enables to guarantee a proper operation of the connection detector, by taking into account possible manufacturing dispersions, and particularly dispersions of the offsets of comparator CMP and/or of amplifier G. In particular, the larger the dispersions, the smaller ratio R2/(R2+R1) will be selected as compared with 1 (in the case of the above-mentioned example of a gain G=2) to limit risks of false detection.

It should be noted that in most analog video formats, for synchronization reasons, the transmitted signal periodically transits through a known non-zero reference voltage level. The analog connection detection is preferably performed during such periods of synchronization of the video signal. This enables to limit risks of false detection for example due to too fast fluctuations of the video signal or to a transition through a zero value of the video signal.

Figure 4:
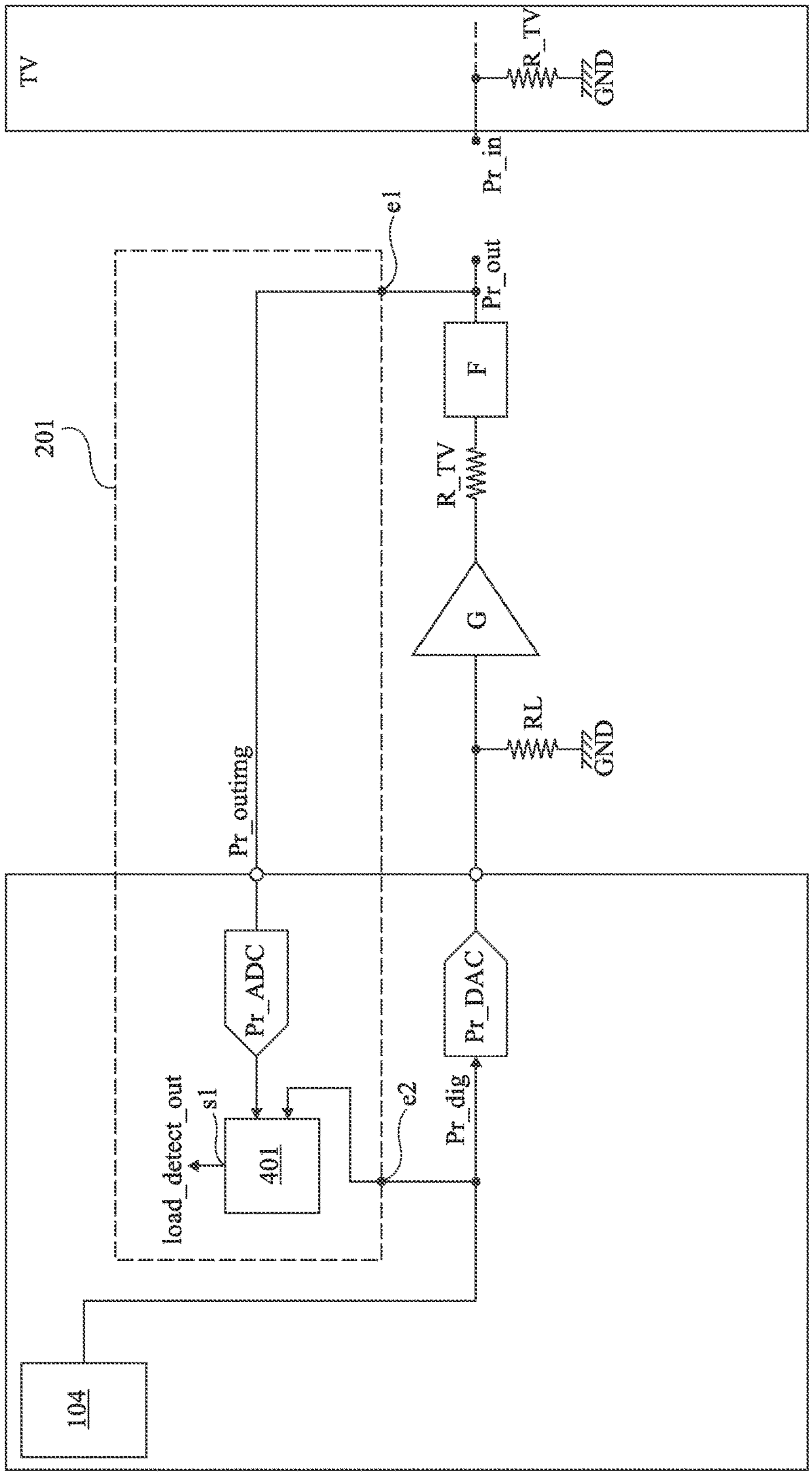
FIG. 4 is an electric diagram of the installation of FIG. 2, illustrating in further detail another embodiment of the video decoder.

FIG. 4 is an electric diagram of the installation of FIG. 2, illustrating in further detail another embodiment of circuit 201 for detecting an analog connection between decoder 103 and display device 101.

In the example of FIG. 4, circuit 201 comprises an analog-to-digital converter Pr_ADC having its input coupled to input terminal e1 of circuit 201. The output of converter Pr_ADC is coupled to a digital processing circuit 401, this circuit further receiving digital signal Pr_dig applied at the input of digital-to-analog converter Pr_DAC, which corresponds to reference signal REF of circuit 201 in this example. As an example, analog-to-digital converter Pr_ADC and circuit 401 are integrated to chip 105. Chip 105 then comprises, in addition to terminal Pr_ana, a terminal of connection to the outside Pr_outimg corresponding to input terminal e1 of circuit 201.

The operation of circuit 201 of FIG. 4 is similar to that of circuit 201 of FIG. 3, with the difference that, in the example of FIG. 4, the comparison between the voltage level of output terminal Pr_out of the decoder and a reference signal REF which is an image of the video signal generated by the decoder, is digitally performed by processing circuit 401. This enables, in particular, to do without the resistive dividing bridge formed by resistors R1 and R2 in the example of FIG. 3. In the example of FIG. 4, circuit 401 generates and supplies on node s1 signal load_detect_out indicating whether a connection is present or not between terminals Pr_out and Pr_in.

Specific embodiments have been described. Various alterations, modifications, and improvements will occur to those skilled in the art. In particular, the described embodiments are not limited to the examples described in relation with FIGS. 3 and 4 of manufacturing of circuit 201 of comparison of a signal representative of the voltage level on output terminal Pr_out of the decoder with a reference signal representative of the video signal generated by the decoder upstream of amplifier G. Other circuits capable of performing such a comparison may be provided.

Further, embodiments where circuit 201 is capable of comparing a signal representative of the voltage level on output terminal Pr_out of the decoder with a reference signal, and of deducing therefrom whether terminal Pr_out is connected or not to input terminal Pr_in of display device 101, have been described. As a variation, circuit 201 may be capable of comparing a signal representative of the current level on output terminal Pr_out of the decoder with a reference signal, and of deducing therefrom whether terminal Pr_out is connected or not to input terminal Pr_in of display device 101. As an example, circuit 201 is capable of comparing the voltage across resistor R_TV of decoder 103 (which is the image of the current flowing through resistor R_TV) with a reference signal, and of deducing therefrom whether terminal Pr_out is connected or not to input terminal Pr_in of display device 101. Indeed, in the absence of a connection between terminals Pr_out and Pr_in, the current in resistor R_TV is substantially zero and the voltage across resistor R_TV is thus substantially zero, while in the presence of such a connection, the current flowing through resistor R_TV is the image of the video signal supplied by the decoder.

Further, the above-described solution for the detection of an analog connection between terminals Pr_out and Pr_in may of course be applied in identical or similar fashion to other analog video output terminals of decoder 103.

Further, the above-described solution may be applied substantially identically for the detection of a connection between an analog output terminal of an audio decoder and an analog input terminal of an audio player.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A video decoder comprising:

a processing circuit configured to supply a composite digital video signal to a first analog output path and to provide a component digital video signal to a second analog output path;

wherein the second analog output path comprises first, second, and third analog output sub-paths, each of the first, second, and third analog output sub-paths comprising:

a digital to analog converter configured to receive a respective portion of the component digital video signal and to output a respective analog video signal;

an analog amplifier configured to receive and amplify the analog video signal;

an impedance matching circuit coupled to an output of the analog amplifier and configured to match impedance of a corresponding input terminal of a display device configured to display the output analog video signal;

a circuit configured to compare a voltage based on the amplified analog video signal to a reference signal and to generate a load connection detect signal based thereupon, the load connection detect signal indicating whether the video decoder is coupled to the display device; and a voltage divider coupled between a node downstream of the impedance matching circuit and the circuit;

wherein the reference signal is a voltage of the analog video signal as output by the digital to analog converter; and wherein the circuit is configured to generate the load connection detect signal as indicating that the video decoder is coupled to the display device where a voltage at a center tap of the voltage divider is less than the voltage of the reference signal, and to generate the load connection detect signal as indicating that the video decoder is not coupled to the display device where the voltage at the center tap of the voltage divider is more than the voltage of the reference signal.

2. The video decoder of claim 1, wherein the circuit comprises a comparator having a non-inverting input coupled to the center tap of the voltage divider, an inverting input coupled to receive the reference signal, and an output configured to generate the load connection detect signal.

3. The video decoder of claim 1, wherein the voltage divider has a divide ratio of less than one.

4. The video decoder of claim 1, wherein the reference signal is the component digital video signal; and further comprising:

an analog to digital converter coupled between a node downstream of the impedance matching circuit and configured to digitize the amplified analog video signal as received from the node; and wherein the circuit comprises a digital processing circuit configured to compare the digitized video signal to the component digital video signal to determine whether the video decoder is coupled to the display device.

5. The video decoder of claim 1, wherein the circuit has an input coupled to an output of the impedance matching circuit.

6. The video decoder of claim 1, further comprising a filter coupled to an output of the impedance matching circuit; and wherein the circuit has an input coupled to the output of the impedance matching circuit.

7. The video decoder of claim 1, further comprising a filter coupled to an output of the impedance matching circuit; and wherein the circuit has an input coupled to the output of the filter.

8. The video decoder of claim 1, wherein the first analog output path comprises:

an digital to analog converter configured to receive the composite digital video signal and to output an analog video signal;

an analog amplifier configured to receive and amplify the analog video signal;

an impedance matching circuit coupled to an output of the analog amplifier and configured to match impedance of a corresponding input terminal of a display device configured to display the output analog video signal;

a circuit configured to compare a voltage based on the amplified analog video signal to a reference signal and to generate a load connection detect signal based thereupon, the load connection detect signal indicating whether the video decoder is coupled to the display device;

a voltage divider coupled between a node downstream of the impedance matching circuit and the circuit;

wherein the reference signal is a voltage of the analog video signal as output by the digital to analog converter; and wherein the circuit is configured to generate the load connection detect signal as indicating that the video decoder is coupled to the display device where a voltage at a center tap of the voltage divider is less than the voltage of the reference signal, and to generate the load connection detect signal as indicating that the video decoder is not coupled to the display device where the voltage at the center tap of the voltage divider is more than the voltage of the reference signal.

9. A method of operating a video decoder, comprising:

providing a composite digital video signal to a first analog output path and providing a component digital video signal to a second analog output path; and for each of first, second, and third sub-component paths of the second analog output path:

converting a respective portion of the component digital video signal to a respective analog video signal;

amplifying the analog video signal;

passing the amplified analog video signal through an impedance matching circuit configured to match impedance to a corresponding input terminal of a display device to display the amplified analog video signal;

comparing a property of the amplified analog video signal to a reference signal to determine whether the amplified analog video signal is coupled to the display device;

passing the amplified analog video signal from the impedance matching circuit through a voltage divider to produce a divided voltage;

determining the amplified analog video signal to be coupled to the display device if the divided voltage is less than a voltage of the reference signal; and determining the amplified analog video signal to not be coupled to the display device if the divided voltage is greater than the voltage of the reference signal.

10. The method of claim 9, wherein the property of the amplified analog video signal is a voltage thereof; and wherein the reference signal is a reference voltage.

11. The method of claim 9, wherein the property of the amplified analog video signal is a voltage across the impedance matching circuit; wherein the reference signal is a nonzero reference voltage; and wherein the amplified analog video signal is determined to be coupled to the display device if a magnitude of the voltage across the impedance matching circuit is greater than the nonzero reference voltage, and to not be coupled to the display device if the magnitude of the voltage across the impedance matching circuit is less than the nonzero reference voltage.

12. The method of claim 9, wherein the reference signal is the component digital video signal; and wherein comparing the property of the amplified analog video signal to the reference signal comprises:

converting the amplified analog video signal to a digitized video signal; and comparing the digitized video signal to the component digital video signal to determine whether the amplified analog video signal is coupled to the display device.

13. The method of claim 9, further comprising, for the first analog output path:

converting the composite digital video signal to an analog video signal;

amplifying the analog video signal;

passing the amplified analog video signal through an impedance matching circuit configured to match impedance to a corresponding input terminal of a display device to display the amplified analog video signal;

comparing a property of the amplified analog video signal to a reference signal to determine whether the amplified analog video signal is coupled to the display device;

passing the amplified analog video signal from the impedance matching circuit through a voltage divider to produce a divided voltage;

determining the amplified analog video signal to be coupled to the display device if the divided voltage is less than a voltage of the reference signal; and determining the amplified analog video signal to not be coupled to the display device if the divided voltage is greater than the voltage of the reference signal.

14. A video decoder, comprising:

a processing circuit configured to supply a composite digital video signal to a first analog output path and to provide a component digital video signal to a second analog output path; and wherein the second analog output path comprises first, second, and third analog output sub-paths, each of the first, second, and third analog output sub-paths comprising:

a digital to analog converter;

an analog amplifier coupled to an output of the digital to analog converter;

an impedance matching circuit coupled between an output of the analog amplifier and a node;

a resistive divider coupled between the node and ground; and a comparator having a non-inverting terminal coupled to a center tap of the resistive divider and an inverting terminal coupled to the output of the digital to analog converter, and generating a flag at its output to indicate whether the video decoder is coupled to a display device.

15. The video decoder of claim 14, wherein the impedance matching circuit is coupled to the node through a filter.

16. The video decoder of claim 14, wherein the impedance matching circuit is directly electrically coupled to the node.

17. The video decoder of claim 14, wherein the impedance matching circuit comprises a resistor.

18. The video decoder of claim 14, wherein the resistive divider comprises a first resistor coupled between the node and the center tap, and a second resistor coupled between the center tap and ground.

19. The video decoder of claim 18, wherein a resistance value of the second resistor is twice that of the first resistor.

20. The video decoder of claim 14, wherein the first analog output path comprises:

an digital to analog converter configured to receive the composite digital video signal and to output an analog video signal;

an analog amplifier configured to receive and amplify the analog video signal;

an impedance matching circuit coupled to an output of the analog amplifier and configured to match impedance of a corresponding input terminal of a display device configured to display the output analog video signal;

a circuit configured to compare a voltage based on the amplified analog video signal to a reference signal and to generate a load connection detect signal based thereupon, the load connection detect signal indicating whether the video decoder is coupled to the display device;

a voltage divider coupled between a node downstream of the impedance matching circuit and the circuit;

wherein the reference signal is a voltage of the analog video signal as output by the digital to analog converter; and wherein the circuit is configured to generate the load connection detect signal as indicating that the video decoder is coupled to the display device where a voltage at a center tap of the voltage divider is less than the voltage of the reference signal, and to generate the load connection detect signal as indicating that the video decoder is not coupled to the display device where the voltage at the center tap of the voltage divider is more than the voltage of the reference signal.

* * * * *